United States Patent [19]

Tsai

[11] Patent Number: 4,678,491
[45] Date of Patent: Jul. 7, 1987

[54] REDUCTION OF MATERIAL BUILDUP BY MEANS OF GAS JET

[75] Inventor: Yih-Wan Tsai, Pittsburgh, Pa.

[73] Assignee: PPG Industries, Inc., Pittsburgh, Pa.

[21] Appl. No.: 799,227

[22] Filed: Nov. 18, 1985

[51] Int. Cl.$^4$ .............................................. C03B 1/00
[52] U.S. Cl. .......................................... 65/27; 65/335; 432/110; 432/111
[58] Field of Search ................ 65/27, 335; 432/110, 432/111

[56] References Cited

U.S. PATENT DOCUMENTS

| | | | |
|---|---|---|---|
| 2,878,004 | 3/1959 | Saeman | 65/27 |
| 3,837,832 | 9/1974 | Pecorado et al. | 65/27 X |
| 4,375,236 | 3/1983 | Tsai | 165/1 |
| 4,381,934 | 5/1983 | Kunkle et al. | 65/135 |
| 4,496,315 | 1/1985 | Savolskis | 432/30 |
| 4,496,316 | 1/1985 | Tsai | 432/30 |
| 4,496,387 | 1/1985 | Heithoff et al. | 65/335 |
| 4,506,726 | 3/1985 | Tsai | 165/1 |
| 4,519,814 | 5/1985 | Demarest, Jr. | 65/27 |
| 4,521,238 | 6/1985 | Heithoff | 65/27 X |

*Primary Examiner*—Arthur Kellogg
*Attorney, Agent, or Firm*—Andrew C. Siminerio

[57] ABSTRACT

Exhaust from a melting vessel passes through a transition section and into a rotary kiln to preheat batch material. A gas jet injects a high velocity gas stream into the transition section to alter its flow and reduce buildup of material due to entrained material in the exhaust leaving sticky deposits on interior surfaces of the transition section and kiln.

18 Claims, 5 Drawing Figures

REDUCTION OF MATERIAL BUILDUP BY MEANS OF GAS JET

BACKGROUND OF THE INVENTION

1. Field of the Invention

This invention relates to feeding of material into a furnace and, in particular, to feeding glass batch material from a rotary kiln through a transition section and into a glass melting furnace while exhaust gas from the furnace preheats the batch material in the rotary kiln.

2a. Technical Considerations

It has long been recognized that exhaust gas from a combustion heated glass melting furnace or other melting process furnace contains large amounts of thermal energy that can be recovered to improve the overall efficiency of the process. Conventionally, regenerators and recuperators have been employed to recover heat from melting process furnaces by preheating combustion air, but their efficiency is less than desired. Instead of preheating combustion air by way of regenerators or recuperators, it has been proposed to recovery waste heat by means of preheating the feed material.

Using the waste heat from the melting furnace to preheat the batch material can lead to certain complications. It is believed that during the melting process certain components of the batch material may become vaporized and may be carried out of the furnace by the exhaust stream along with any particulate matter that may become entrained in the gas. The vaporized materials may condense on an interior surface of a preheating vessel or in a transition section that links the preheating vessel with the melting furnace for passage of the hot exhaust gas therethrough. When condensation occurs, the condensed vapors may leave a glassy, sticky deposit. The particulate matter may soften and also become a sticky deposit due to its exposure to the hot temperature exhaust gas. Accumulation of these sticky deposits may cause buildup of batch material as it moves through the kiln resulting in the clogging of the batch feed arrangement. Furthermore, entrained particulates may accumulate on deposits in the transition section and affect the preheating arrangement.

In U.S. Pat. No. 4,381,934 to Kunkle and Matesa, there is disclosed an intensified batch liquefying process in which large volumes of batch are efficiently liquefied in a relatively small space. This type of process, particularly when using intensified heat sources, produces relatively small volumes of high temperature exhaust gas. This exhaust gas can be recovered and used to directly heat the batch stream so as to improve the efficiency of the process. It is desirable to be able to direct the preheating exhaust gas as it passes from the batch liquefier to the kiln away from surfaces which tend to collect material in the exhaust gas stream so as to minimize clogging in the rotary kiln and the exhaust gas passageway from the liquefier to the kiln.

2b. Patents of Interest

U.S. Pat. Nos. 4,375,236 and 4,506,726 to Tsai teach the use of air jets to redistribute the air flow in a regenerative furnace for melting glass batch material. Air jets positioned in the gas distributing space of the regenerators modify air flow so that air Passing through the packing is evenly distributed throughout the packing to prevent localized overheating.

U.S. Pat. Nos. 4,496,315 to Savolskis and 4,496,316 to Tsai teach the use of air jets for controlling the flow of the air into and out of the melting chamber of a regenerative furnace. In one embodiment the air jets are positioned in the target wall of the regenerator and are directed at selected firing ports. The jets can be used to either increase or reduce the air flow from the regenerator into the chamber through selected firing ports. In another embodiment, angled air jets can be positioned directly in the firing ports to increase or decrease air flow.

SUMMARY OF THE INVENTION

An object of the invention is to reduce the buildup of glassy materials and batch with the rotary kiln and transition section of a multi-stage melting process. Exhaust gas from the melting furnace passes through the transition section and into the kiln to preheat batch material in the kiln. The exhaust gas contains solid, liquid, and condensible carryover that collects in the transition and rotary kiln leaving sticky deposits that tend to collect batch material or other particulates. Often times these accumulations can clog the transition section and/or rotary kiln charge arrangement.

In the present invention an air jet injects a high velocity air stream into the transition section to direct the exhaust gas away from the transition section walls and away from critical sections of the rotary kiln's interior wall. The position of the air jet can be changed and the air stream velocity and flow rate can be adjusted so as to optimize the effectiveness of the air jet as the batch material or melting furnace firing rate changes.

DETAILED DESCRIPTION OF THE INVENTION

This invention is preferably used in a batch preheating arrangement in a two-stage batch liquefaction process as disclosed in commonly assigned U.S. Pat. No. 4,519,814, to Demarest, Jr., which teachings are hereby incorporated by reference, but can be used in any melting process in which preheating gas carries material that can adversely affect the system throughput.

In a two-stage batch liquefaction process, batch is transported relatively slowly in a first zone as it is heated to a temperature approaching incipient liquefaction. The batch is then transferred through a transition section to a second zone where, in the preferred embodiment, the preheated batch is rapidly liquefied by intense heating. The liquefied batch flows out of the second zone into a collecting vessel. This two-stage process separates the batch liquefaction operation into a preliquefaction stage and a liquefaction stage and provides each stage with conditions that maximize the efficiency of each stage. In the first zone where the preliquefaction stage occurs, there are no essential time restraints in transferring heat to the batch as long as the batch remains free flowing. In the second zone where the liquefaction stage occurs, intense heat is applied to the batch in a relatively small space to rapidly convert the batch to a liquefied state. The first zone preferably employs waste heat from the second zone. The batch is conveyed through the first zone, preferably at a relatively slow rate so as to maximize transfer of heat from the exhaust gas to the batch.

Preheating batch materials in accordance with the present invention is particularly advantageous in combination with the ablation enhancing batch liquefying arrangements as described in U.S. Pat. No. 4,381,934, which teachings are hereby incorporated by reference. Preheating batch reduces the heat requirement for liquefying the batch and yield a greater throughput in the melter. The batch liquefaction arrangements of U.S. Pat. No. 4,381,934 are adapted to enhance the runoff of liquefied batch by providing a sloped melting surface and rapid draining of the liquefied material and are particularly well suited to take advantage of the higher throughputs that can be achieved by batch preheating. Second zone embodiments such as those taught in U.S. Pat. No. 4,381,934 wherein a layer of batch encircles the heat source are well suited for use with high temperatures produced by oxygen fired combustion. Oxygen firing in such an arrangement produces a relatively small volume of high temperature exhaust gas as compared to conventional glass melting furnaces. This small volume, high temperature exhaust gas stream is particularly well suited for heat recovery and preheating of the batch. Other high temperature heat sources also lend themselves to this invention.

Figure 1:
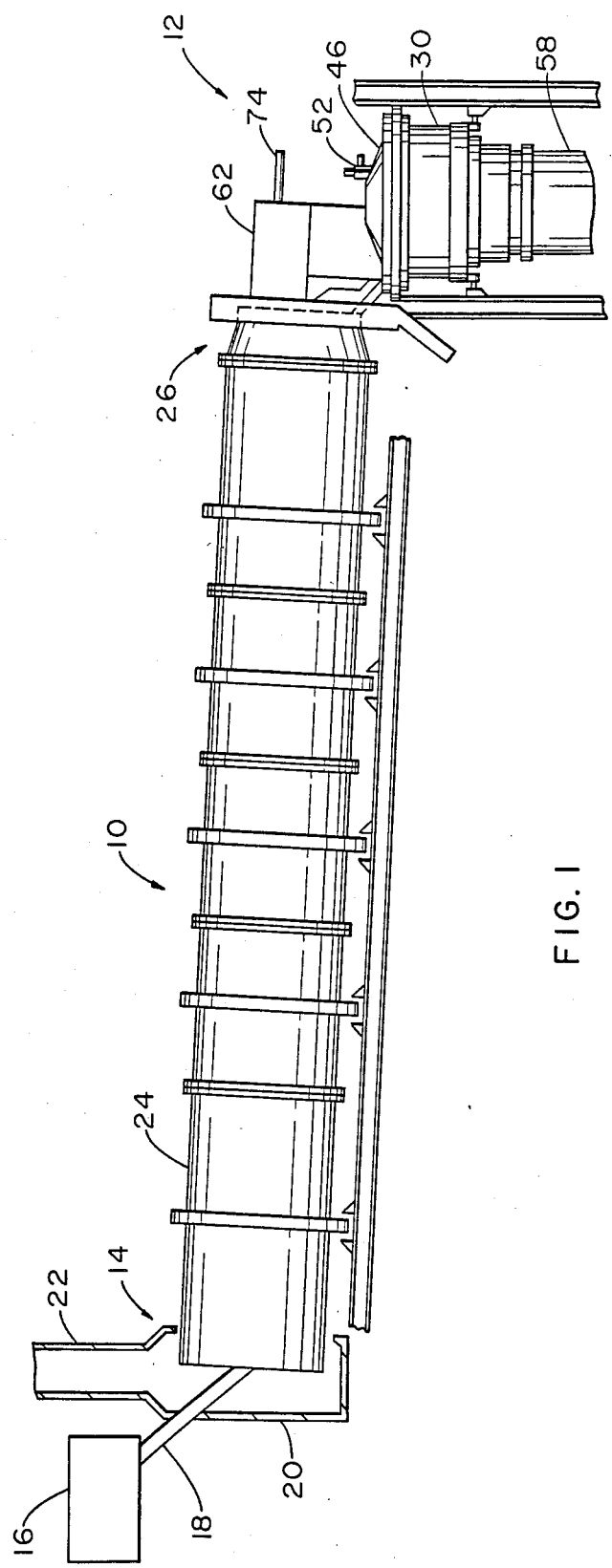
FIG. 1 is a side elevation view of a two-stage batch liquefaction arrangement.

FIG. 1 illustrates a rotary kiln 10 as it feeds batch material to a liquefaction vessel 12. Batch material is fed into the cold or inlet end 14 of the kiln from a continuous weighing and metering device 16 through delivery tube 18. The cold end 14 of the rotary kiln 10 is enclosed by an exhaust box 20 which directs exhaust gas leaving the rotary kiln 10 to a duct 22. The duct 22 may lead to a fan (not shown) which provides the draft for drawing the exhaust gases through the rotary kiln 10 and for discharging the exhaust gas to the atmosphere through a stack (not shown).

Figure 3:
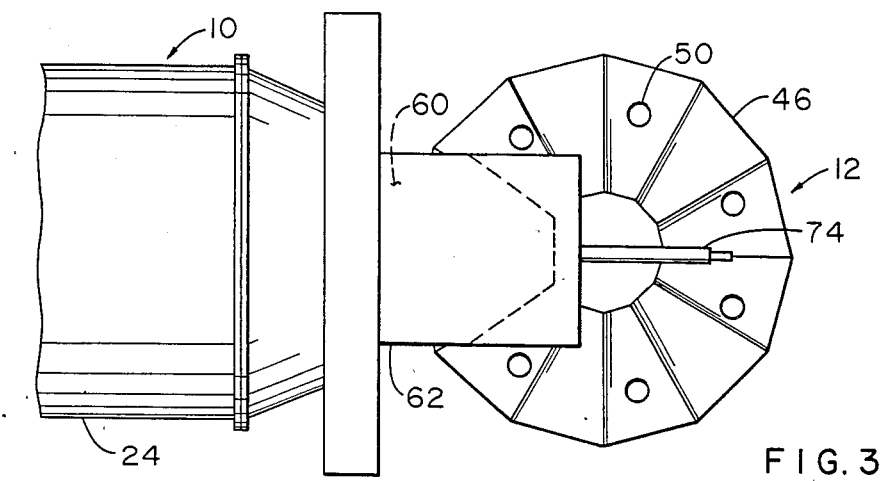
FIG. 3 is a top view of the arrangement of FIG. 2 as shown in FIG. 1.

The rotary kiln is generally of conventional design consisting basically of a cylindrical metallic shell 24 mounted for rotation about a cylindrical axis which is inclined slightly downward from horizontal so as to convey the batch material from the cold end 14 towards the hot end 26 of the rotary kiln 10 by gravity and tumbling. Referring to FIG. 3, an insulated liner 28 in the kiln is used to maintain heat within the kiln 10. A wear resistant metal liner (not shown) may be used within the kiln 10 to help prevent deterioration of insulating wall 28.

Figure 2:
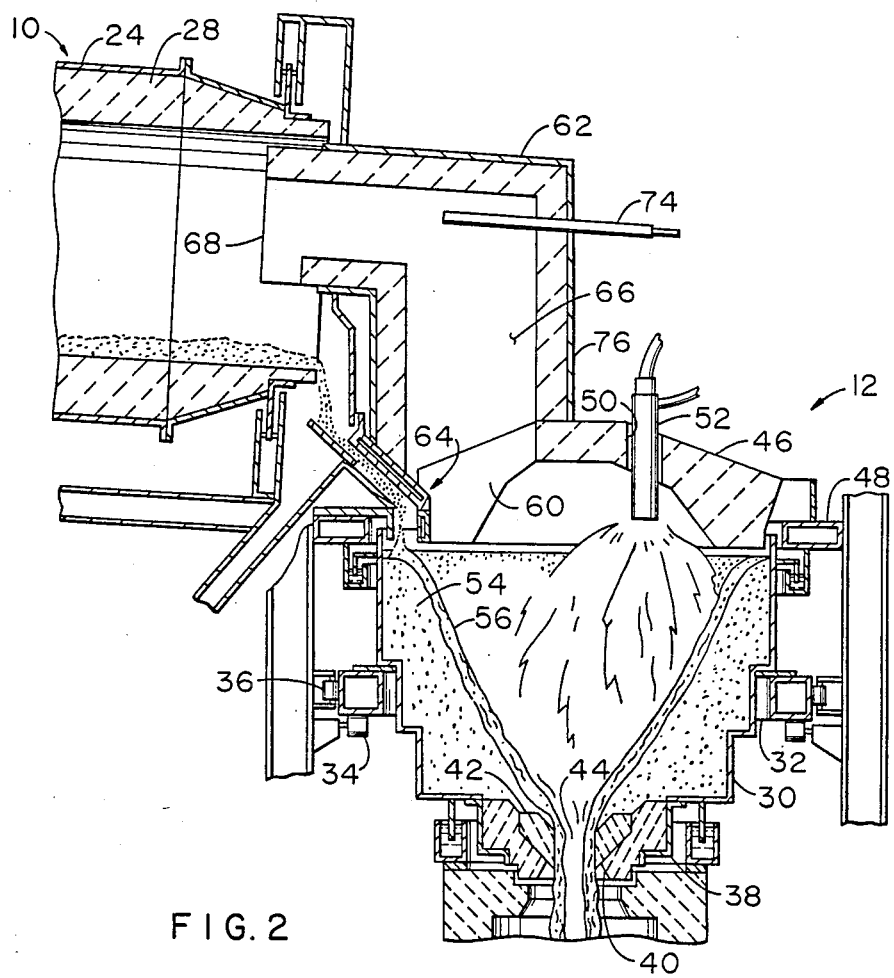
FIG. 2 is an enlarged cross-section of the arrangement shown in FIG. 1 at the discharge end of the rotary kiln, the liquefaction vessel, and the transition section in accordance with the preferred embodiment of the present invention.

The liquefaction vessel 12 is of the type similar to that disclosed in U.S. Pat. No. 4,496,387 to Heithoff et al., which teachings are hereby incorporated by reference, includes steel drum 30 which, as shown in FIG. 2, may be provided with step sides so as to decrease the amount of mass being rotated. The drum 30, however, could have straight cylindrical sides or could be provided with a conical shape. The drum 30 is supported on a circular frame 32 which is, in turn, mounted for rotation about a generally vertical axis, corresponding to the center line of the drum, on a plurality of support rollers 34 and aligning rollers 36. A bottom section 38 houses an outlet assembly which may be detached from the remainder of the drum 30. The housing 38 may be lined with an annulus of refractory material 40 such as castable refractory cement in which is seated a ring-like bushing 42 of erosion resistant refractory. The bushing 42 may be comprised of a plurality of cut pieces of ceramic. An open center 44 and the bushing 42 comprises the outlet opening from the liquefaction vessel 12. An upwardly domed refractory lid 46 is provided with stationary support by way of a circular frame member 48. The lid 46 includes at least one opening 50 for inserting a burner 52. The burner 52 is preferably a multi-port burner and is preferably fired with oxygen and a gaseous fuel, such as methane.

Within the liquefaction vessel 12, a stable layer of unmelted batch 54 is maintained on the walls of the drum 30 encircling the central cavity within which combustion takes place. The heat from the burner 52 causes a transient layer 56 of the batch to become liquefied and to flow on the stable layer 54 downwardly through the bottom opening 44. The liquefied batch then flows out of the liquefaction vessel 12 and may be collected in a vessel 58 below the liquefaction vessel 12 for further processing as needed.

The exhaust gases escape upwardly through an opening 60 in the lid 46 and into a transition section 62 in a manner similar to that disclosed in U.S. Pat. No. 4,496,387. The transition section 62 provides the connection between the hot end 26 of the rotary kiln 10 and the liquefaction vessel 12 for the pulverulent preheated material and the exhaust gas. The transition section 62 comprises a chute 64 to carry the batch therebetween and an exhaust duct 66 that includes a nose piece extension 68. The nose piece extension 68 directs exhausts gases into an upper portion of the rotary kiln 10 away from the glass batch and serves to shade the rotary kiln from radiant heat transfer from the liquefaction vessel 12.

Figure 4:
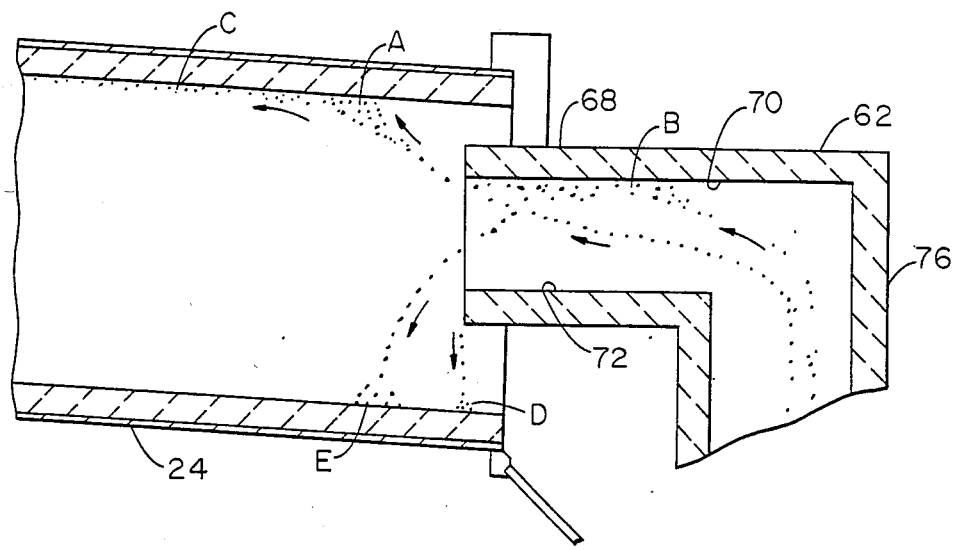
FIG. 4 is a schematic view of the transition section and discharge end of the rotary kiln illustrating the exhaust gas flow therethrough.

During the melting process in the liquefaction vessel 12, various materials may be entrained in the hot exhaust gas stream and are carried through the transition section 62 and into the kiln 10. Entrained airborne particulates from the vessel 12 may soften due to the high temperature of the exhaust gas. Furthermore, vaporized material resulting from the melting process may enter the exhaust stream. In typical soda-lime-silica glass batches, the vaporized material is comprised chiefly of sodium compounds. The softened particulates and vaporized material may stick to critical areas of the two-stage process resulting in buildup of batch material and possible clogging of the system. Referring to FIG. 4, site A shows a typical buildup location of material entrained in the exhaust gas from the vessel 12 that sticks to the kiln 10 at the top of its rotation. As the kiln continues to rotate, the batch material may stick to fresh sticky deposit sites forming a ring of material. The entrained material rises to the upper interior surface of the kiln 10 due to thermal convections. Buildup at site B at the crown 70 of the transition section 62 in some cases has been found to be similar to that at site A. At site C, some condensible material is typically found adhered to the kiln 10 but with little additional batch material build up, apparently due to such factors as sufficient cooling to a non-sticky temperature at its surface or being covered with other particulates from the exhaust stream so as to prevent additional batch from sticking to it. Site D designates a region at the discharge end of the kiln 10 where buildup has been found to be characterized by molten material that apparently drips from the floor 72 of the transition section 62. Site E buildup may result from drippage blown from the crown 70 of the transition section 62 that sticks to the interior surface of the kiln 10. Batch material may stick to new deposition sites at sites D and E. Sufficient buildup in the transition section 62 and the kiln 10 can lead to clogging of the exhaust stream into the kiln 10 and clogging of the batch feed arrangement.

Referring now to FIG. 2, to reduce this buildup, a gas jet 74 of the present invention may be positioned, for example, at the forward wall 76 of the transition section 62 to direct a high velocity stream of compressed gas in the direction of the nose piece extension 68 and into the kiln 10. This gas stream is sufficient to redirect the preheating exhaust stream such that any entrained material prone to adhering to any interior surface upon contact therewith, is either (1) directed through the transition 62 and back into the kiln 10 a sufficient distance from the discharge end 26 so that if it does stick to the wall of the kiln 10, it has cooled sufficiently so that additional batch does not stick to it, (2) falls back into the batch material, or (3) is carried out of the kiln 10 along with the exhaust gas and in the duct 22. Although not limiting to this invention, compressed air is preferably used in the jet 74.

The high velocity air stream alters the exhaust gas flow in two ways. The air stream merges with the exhaust gas and forces it down from its original flow path. Furthermore, the air stream passes through the exhaust gas at a high velocity creating a low pressure area through the center of the nose piece 68 of the transition section 62. The surrounding exhaust gas is drawn towards the low pressure area and is carried along with the air stream.

Figure 5:
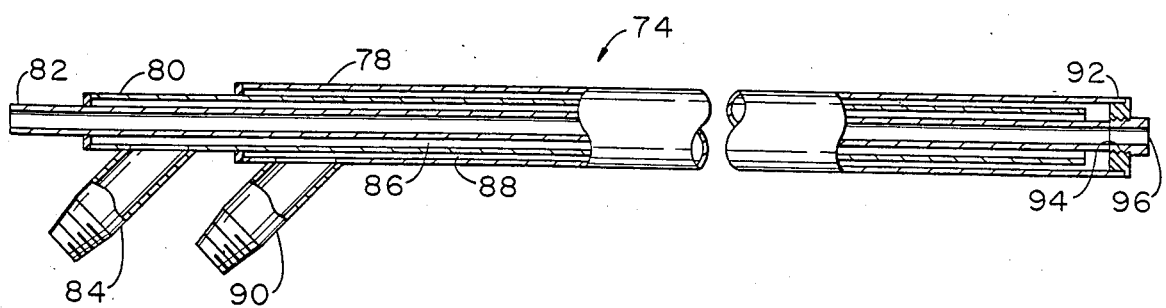
FIG. 5 is a cross-sectional view of an embodiment of the air jet.

Referring now to FIG. 5, in the preferred embodiment, the jet 74 is water cooled, but it is understood that the cooling mechanism does not affect the use of the air jet 74 as taught in this invention. Three concentric pipe sections, 78, 80 and 82, form the air jet 74 with sections 78 and 80 forming the cooling jacket. Cooling fluid enters the inlet 84 and passes along annular chamber 86 between pipe sections 80 and 82. The fluid returns via annular chamber 88 between pipe sections 78 and 80 and exit through outlet 90. Tip section 92 of the jet 74 includes an internal threaded surface 94 for easy installation and removal of threaded nozzles 96. Due to the high temperature environment of the jet 74, pipe sections 78, 80 and 82 are preferably stainless steel and nozzle 96 is preferably nickel.

To optimize efficiency, the jet 74 preferably provides (a) a concentrated high velocity air stream, to alter the flow of the exhaust gas, (b) at a low flow rate so as to minimize additional gas flow through the system. Initially, three different nozzle size openings were tested: 0.20 inches (0.51 cm) I.D., 0.15 inches (0.38 cm) I.D., and 0.125 inches (0.32 cm) I.D. The results show that each nozzle could effectively alter the flow of the exhaust gas. It was concluded, however, that the larger nozzle opening size provides greater flexibility in adjusting the compressed air flow rate compared to the others tested. The actual flow rate required for a process is empirical and varies based on the type of process, the total system throughput, firing rate, nozzle opening size, air pressure and air jet flow velocity but it is expected that the flow rate of the jet 90 need not be more than 10% of the flow rate of the exhaust gas and preferably less than 5%. Furthermore, the air jet flow velocity is preferably at least an order of magnitude higher than the velocity of the exhaust gas. Flow rate can be controlled by a metering and valve arrangement (not shown) connecting the jet 74 to a compressed air source (not shown) in a manner well known in the art.

Placement of the jet nozzle 96 within the transition section 62 will affect the buildup due to the exhaust gas stream in the nose piece 68 and rotary kiln 10. Moving the nozzle 96 further into the nose piece extension 68 will increase the effectiveness of the jet 74 in preventing buildup at site A while making it less effective at site B. By drawing the nozzle 96 further out of the nose piece extension 68, it becomes more effective in preventing buildup at site B but less effective at site A. Furthermore, the forward wall 76 can be provided with a plurality of jet mounting positions so that not only could the forward and rearward position of the nozzle 96 be changed but also its up and down as well as its side to side movement. As an alternative, the nozzle 96 position could be changed by providing a pivoting mount of the jet 74 in the forward wall 76 of the transition 62.

It should be appreciated that multiple gas jets may be used, each positioned to prevent buildup at a specific location. Also a jet could have a nozzle with multiple openings to effect buildup at multiple sites within the transition section 62 and kiln 10.

The jet 74 can be equally effective if installed through the crown 70 of the transition section 62 extending into the nose piece extension 68, and fitted with a slotted nozzle so as to direct the air stream sideways into the kiln 10. In addition, the crown 70 could include a plurality of mounting positions so that the nozzle 96 could effectively be moved into and out from the nose piece 68 as well as up and down, and from side to side.

The flow rate from the jet 74 can be monitored and automatically controlled based on variations in the firing rate and associated volume of exhaust gas passing through the transition section 62. It should be further appreciated that the in and out movement of the jet 74 can be automated and controlled based on the firing rate. If it is determined that a specific firing rate for a batch material tends to produce a detrimental accumulation in the transition section 62 rather than the kiln 10 or vice versa, the jet 74 can be automatically repositioned to its most effective position.

It is apparent, based on the teachings of this invention that the jet 74 can be positioned at locations other than in the transition section 62 to reduce buildup of material within the system. A gas jet can be positioned directly in the hot end 26 of the rotary kiln 10 to prevent accumulation resulting from buildup at site A.

Although the present invention has been disclosed in conjunction with a two-stage glass liquefaction process, the invention may have applicability in other multistage heating processes where excessive temperatures pose similar problems in the first stage.

The form of the invention shown and described herein represents an illustrative embodiment and is understood that various changes can be made without departing from the scope of the invention.

I claim:

1. In an apparatus for melting material having a heating means, means for preheating and moving said material toward said heating means, means interconnecting said heating means and moving means to move said material there through and into said heating means, and means for ducting exhaust gas from said heating means into said moving means, wherein entrained material in said exhaust gas leaves deposits within said duct means, the improvement comprising:

gas jet means mounted relative to said duct means and oriented so as to accelerate the flow of said exhaust gas through said duct means and into said preheating means to reduce said deposit within said duct means.

2. The apparatus as in claim 1 wherein said accelerating means alters the flow of said exhausted gas within said duct such that said gas flows away from the walls of said duct.

3. The apparatus as in claim 1 wherein said gas jet means includes at least one gas jet with a nozzle member positioned and oriented relative to said exhaust gas to direct a high velocity air stream in a predetermined direction through said duct means.

4. The apparatus as in claim 3 wherein said gas jet is encased in a cooling jacket.

5. The apparatus as in claim 4 wherein said gas jet is water cooled.

6. The apparatus as in claim 3 further including means to adjust the position of said nozzle of said gas jet relative to said exhaust.

7. The apparatus as in claim 6 wherein said position adjusting means includes automatic controls for repositioning said nozzle.

8. The apparatus as in claim 3 further including means to adjust the velocity and flow rate of said high velocity gas stream.

9. The apparatus as in claim 8 wherein said velocity adjusting means includes automatic controls to adjust said high velocity gas stream.

10. The apparatus as in claim 8 wherein the flow rate of said gas stream is no more than 10% of the flow rate of said exhaust.

11. In an apparatus for liquefying batch materials including rotary kiln means for preheating bath materials comprised of an elongated cylindrical vessel mounted for rotation about its cylindrical axis, batch feeding means for feeding batch to a first end of said rotary kiln, a batch liquefying vessel adjacent to the opposite end of said rotary kiln and including means for heating said batch materials to a liquefied temperature, batch transfer means for collecting preheated batch being discharged from said rotary kiln and for directing said batch material into said liquefying vessel, and duct means for directing exhaust gas from said liquefying vessel to said kiln, wherein entrained material in said exhaust gas leaves deposits on interior surfaces of said duct means as said exhaust gas passes therethrough, the improvement comprising:

gas jet means mounted relative to said duct means and oriented so as to acceleate the flow of said exhaust gas as it passes through said duct and into said rotary kiln to reduce said deposits within said duct means.

12. The apparatus as in claim 11 wherein said accelerating means includes means to inject a high velocity gas stream into said exhaust gas passing through said duct.

13. The apparatus as in claim 12 wherein said injecting means includes at least one gas jet with a nozzle member positioned within said duct.

14. The apparatus as in claim 13 wherein the position of said nozzle member is adjustable within said duct.

15. In a method of liquefying pulverulent batch material including the steps of moving batch material through a first heating zone, removing said material from said first heating zone and depositing said material into a second heating zone where the temperature of said material is raised to liquefy said material, and directing hot exhaust gas from said second heating zone through a transition section and into said first heating zone to expose said batch material in said first heating zone to said hot exhaust gas to preheat said batch material, wherein entrained material in said exhaust gas leaves deposits on interior surfaces of said transition sections or said first heating zone, the improvement comprising:

accelerating said exhaust gas in said transition section to alter the flow of said exhaust gas through said transition section so as to reduce buildup of material carried by said exhaust gas.

16. The method as in claim 15 wherein said first zone is a preheating zone and said second zone is a batch liquefying zone and further wherein said accelerating step includes injecting a stream of gas into said exhaust gas at a predetermined velocity, flow rate, and position further including the step of varying said velocity, flow rate, and/or position of said jet of air.

17. In a method of liquefying pulverulent batch material including the steps of moving batch material through a first heating zone, removing said material from said first heating zone and depositing said material into a second heating zone where the temperature of said material is raised to liquefy said material, and directing hot exhaust gas from said second heating zone through a transition section and into said first heating zone to expose said batch material in said first heating zone to said hot exhaust gas to preheat said batch material, wherein entrained material in said exhaust gas leaves deposits on interior surfaces of said transition section or said first heating zone, the improvement comprising:

moving a gas stream into the exhaust gas as said exhaust gas flows through said transition section to redirect the exhaust gas flow therethrough in a manner to reduce said deposits on said interior surfaces of said transition section or said first heating zone.

18. In an apparatus for preheating free flowing pulverulent material having a preheating vessel, means for moving said material through said preheating vessel and means for ducting hot gas into said preheating vessel to preheat said material wherein entrained material in said hot gas leaves deposits on interior surfaces of said preheating vessel, the improvement comprising:

gas jet means mounted relative to said preheating vessel and oriented so as to accelerate said hot gas away from said portions of said vessel to reduce said deposits on said surfaces.

* * * * *